United States Patent
Beaupied et al.

(10) Patent No.: US 8,657,061 B1
(45) Date of Patent: Feb. 25, 2014

(54) FILL-PLUG FOR DRIVETRAIN COMPONENT

(71) Applicants: Joseph A Beaupied, Royal Oak, MI (US); Dermot A Ashby, Ada, MI (US); Riccardo Capitanio, Troy, MI (US)

(72) Inventors: Joseph A Beaupied, Royal Oak, MI (US); Dermot A Ashby, Ada, MI (US); Riccardo Capitanio, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/633,166

(22) Filed: Oct. 2, 2012

(51) Int. Cl.
*B60K 17/00* (2006.01)
*F01M 11/04* (2006.01)

(52) U.S. Cl.
USPC .................... 180/377; 180/299; 280/124.109; 184/1.5

(58) Field of Classification Search
CPC ... F01M 11/00; F01M 11/04; F01M 11/0408; F01M 11/2011; F01M 11/0416; F01M 11/0425; F01M 11/0433; F01M 11/0441; F01M 11/0458; F01M 11/0491
USPC ........... 180/299, 312, 377, 300; 280/124.109; 123/196 R; 184/1.5, 105.1, 105.3, 106, 184/109; 137/572; 138/89, 90, 91; 188/352; 4/295; 411/371.1, 378
See application file for complete search history.

(56) References Cited

U.S. PATENT DOCUMENTS

| | | | | |
|---|---|---|---|---|
| 1,509,023 | A * | 9/1924 | Page | 251/101 |
| 3,625,310 | A * | 12/1971 | Herrick | 184/6.12 |
| 3,727,638 | A * | 4/1973 | Zaremba et al. | 137/572 |
| 3,825,090 | A | 7/1974 | Runkle et al. | |
| 3,869,391 | A * | 3/1975 | Kramer | 210/222 |
| 3,948,481 | A * | 4/1976 | Pollock | 251/351 |
| 4,779,834 | A | 10/1988 | Bittner | |
| 4,807,847 | A * | 2/1989 | Martz | 251/144 |
| 5,086,522 | A * | 2/1992 | Stofko, Sr. | 4/295 |
| 5,373,914 | A * | 12/1994 | Maher | 184/1.5 |
| 5,526,899 | A * | 6/1996 | Billings | 184/105.3 |
| 6,179,348 | B1 * | 1/2001 | Okamoto | 285/334.5 |
| 6,234,268 | B1 | 5/2001 | Savage et al. | |
| 6,581,905 | B2 * | 6/2003 | Rafko et al. | 251/148 |
| 7,401,761 | B2 * | 7/2008 | Gardner et al. | 251/144 |
| 8,281,896 | B2 * | 10/2012 | Morgan | 184/1.5 |
| 2008/0308351 | A1 * | 12/2008 | Godek | 184/1.5 |
| 2009/0026014 | A1 * | 1/2009 | Martin et al. | 184/1.5 |

FOREIGN PATENT DOCUMENTS

WO WO2011/113913 9/2011

* cited by examiner

*Primary Examiner* — Joseph Rocca
(74) *Attorney, Agent, or Firm* — Frederick A. Krieger

(57) ABSTRACT

A vehicle is provided that may include a chassis, a mounting bracket, a drivetrain component, a first shaft and a second shaft. The mounting bracket may be secured to the chassis. The drivetrain component may include a housing defining an internal cavity and including a fluid fill-hole in communication with the internal cavity and extending through an exterior surface of the housing. The first shaft may engage the fluid fill-hole and may have a head on one end. The second shaft may extend outward from the head and may engage an aperture of the mounting bracket. The second shaft may bear a mounting load of the housing and may transmit at least a portion of the mounting load through the first shaft.

20 Claims, 4 Drawing Sheets

US 8,657,061 B1

FILL-PLUG FOR DRIVETRAIN COMPONENT

FIELD

The present disclosure relates to a fill-plug for a drivetrain component.

BACKGROUND

A vehicle drivetrain component such as a transmission or differential, for example, may include a housing defining a cavity in which a set of gears and/or other movable component may be disposed. The housing may include a fill-hole through which a lubricant or other fluid may be poured into the cavity to lubricate and/or cool the gears and/or other movable components. A threaded plug is typically provided that removably engages and seals the fill-hole.

SUMMARY

The present disclosure provides a drivetrain component adapted to be secured to a structure for securing the drivetrain component relative to a vehicle frame. The drivetrain component may include a housing and a fill-plug. The housing may define an internal cavity adapted to receive a fluid. The housing may include a fill-hole in communication with the internal cavity. The fill-plug may include a first shaft, a second shaft and at least one head disposed between the first and second shafts. The first shaft may engage the fill-hole and may cooperate with the head to seal the fill-hole. The second shaft may extend away from the fill-hole and may be adapted to engage the structure.

In some embodiments, the first and second shafts and the head may be integrally formed.

In some embodiments, the fill-plug may include a pair of heads fixed to each other.

In some embodiments, the first and second shafts may be substantially axially aligned with each other and extend from the head in opposite directions.

In some embodiments, the fill-plug may bear at least a portion of a load of mounting the drivetrain component to the vehicle frame.

In some embodiments, the housing may include a transmission housing.

In some embodiments, at least one of a transmission gearset and a differential gearset is disposed within the internal cavity.

In some embodiments, the internal cavity may contain a volume of lubricant.

In some embodiments, the housing may include a boss through which the fill-hole extends. The head may sealingly engage a surface of the boss. An O-ring and/or another seal or gasket may be disposed between the head and the surface of the boss to facilitate a sealed relationship therebetween.

In some embodiments, the fill-plug includes a sub-plug removably engaging an aperture in at least one of the first and second shafts. The aperture may be in fluid communication with the internal cavity. In some embodiments, the aperture may extend through the second shaft and may be in fluid communication with another aperture that extends through the first shaft. The aperture in the first shaft may include a smaller diameter than the aperture in the second shaft.

In another form, the present disclosure provides a vehicle that may include a chassis, a mounting bracket, a drivetrain component, a first shaft and a second shaft. The mounting bracket may be secured to the chassis. The drivetrain component may include a housing defining an internal cavity and including a fluid fill-hole in communication with the internal cavity and extending through an exterior surface of the housing. The first shaft may engage the fluid fill-hole and may have a head on one end. The second shaft may extend outward from the head and may engage an aperture of the mounting bracket. The second shaft may bear at least a portion of a mounting load of the housing and may transmit at least a portion of the mounting load through the first shaft.

In some embodiments, the second shaft may include a head that is fixed to the head of the first shaft. In some embodiments, a pin may engage the heads of the first and second shafts and may align the first and second shafts relative to each other.

In some embodiments, the drivetrain component may include a transmission.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
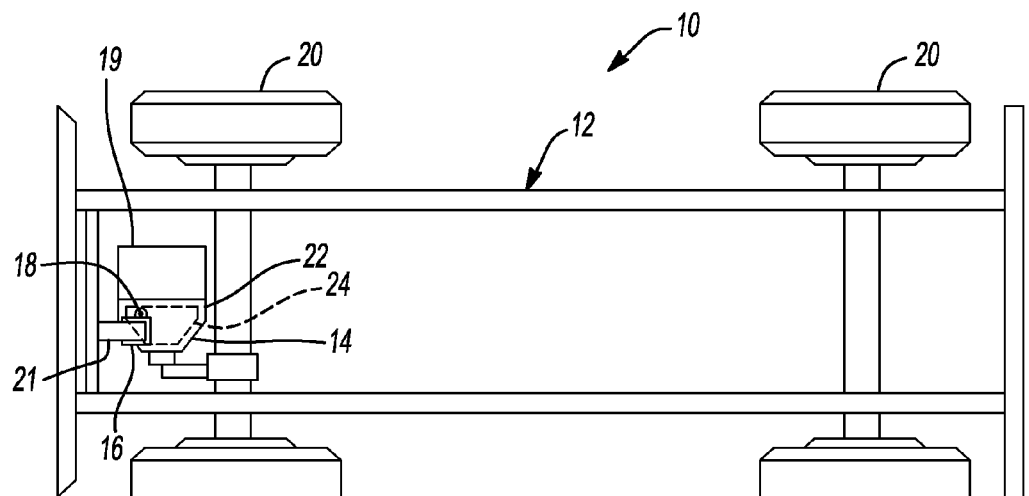
FIG. 1 is a schematic representation of a vehicle having a chassis and a drivetrain component secured to the chassis according to the principles of the present disclosure.

In an exemplary embodiment and with reference to FIG. 1, a vehicle 10 is provided that may include a chassis 12, a drivetrain component 14, a mounting bracket 16 and a fill-plug 18. The drivetrain component 14 can be a transmission or a differential, for example, or any other component or subassembly for transmitting power from a motor or engine 19 of the vehicle to one or more wheels 20 of the vehicle 10. The drivetrain component 14 may be secured to the mounting bracket 16 which, in turn, may be mounted to a structural member 21 of the chassis 12. As will be subsequently described, the fill-plug 18 may engage a fill-hole through which fluid may be poured to lubricate and/or cool the drivetrain component 14 and/or provide a hydraulic medium for the drivetrain component 14. The fill-plug 18 may also engage the mounting bracket 16 to couple the drivetrain component 14 to the structural member 21 and may bear at least a portion of a load of mounting the drivetrain component 14 to the structural member 21. By coupling the drivetrain component 14 to the structural member 21, the fill-plug 18 may also bear at least a portion of dynamic additive loads on the drivetrain component 14 that may arise through operation of the vehicle 10 (e.g., during acceleration, braking, cornering, bumps, vibration and/or other road noise).

It will be appreciated that the structural member 21 could be a chassis component or any other structure for supporting the drivetrain component 14 relative to the chassis 12. While the example provided in FIG. 1 includes the structural member 21 extending from the drivetrain component 14 toward a front end of the vehicle 10, in some embodiments, the structural member 21 may extend from the drivetrain component 14 toward a rear end of the vehicle 10.

Figure 2:
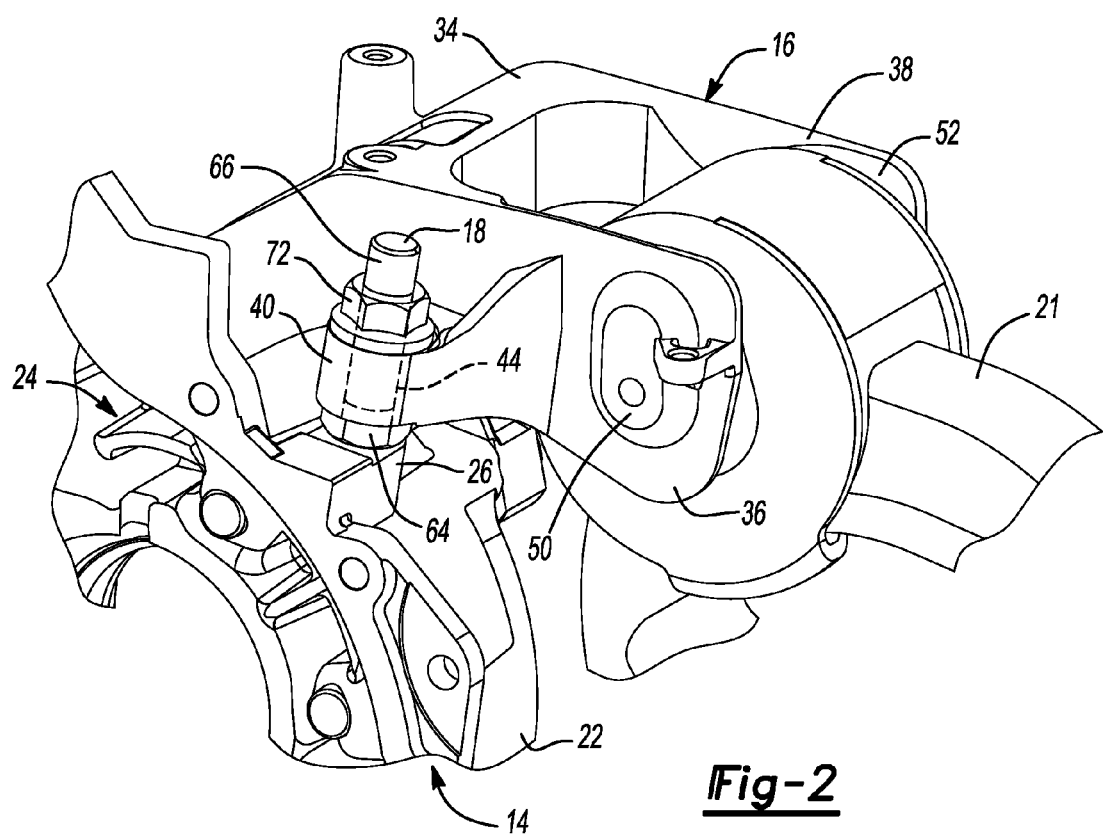
FIG. 2 is a perspective view of a portion of the drivetrain component and a mounting bracket secured to the drivetrain component according to the principles of the present disclosure.
Figure 3:
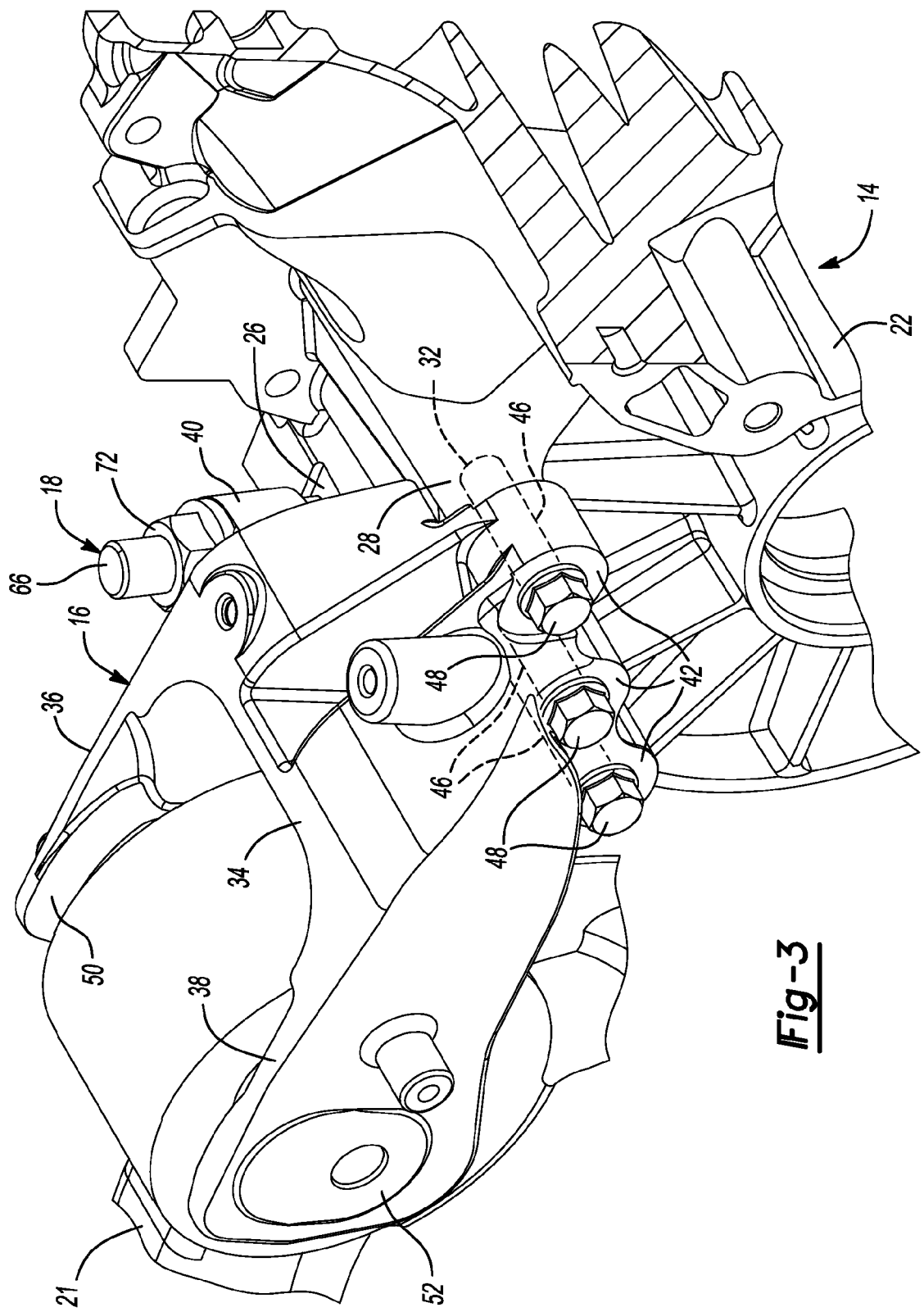
FIG. 3 is another perspective view of a portion of the drivetrain component and the mounting bracket secured to the drivetrain component according to the principles of the present disclosure.

Referring now to FIGS. 1-4, the drivetrain component 14 may include a housing 22 defining an internal cavity 24 (FIG. 1). A set of gears (not shown) and/or other movable components may be disposed within the cavity 24 for transmitting motion between the engine 19 of the vehicle 10 and the wheels 20. The internal cavity 24 may also store a volume of fluid such as a lubricant or coolant, for example. A first boss 26 and a plurality of second bosses 28 (only one of which is shown in FIG. 3) may extend from one or more exterior surfaces 29 of the housing 22. The first boss 26 may include a threaded fill-hole 30 (FIG. 4) that may extend through the first boss 26 and may be in fluid communication with the cavity 24. Each of the second bosses 28 may include a blind, threaded aperture 32 (only one of which is shown in FIG. 3). In the particular embodiment shown in the figures, the housing 22 includes three second bosses 28 and corresponding apertures 32, however, in other embodiments, the housing 22 could include any number of second bosses 28 and apertures 32 or may not include any second bosses with threaded apertures. The housing 22 may also include a drain-hole and drain-plug (neither are shown in the figures) to selectively drain fluid from the internal cavity 24.

Figure 4:
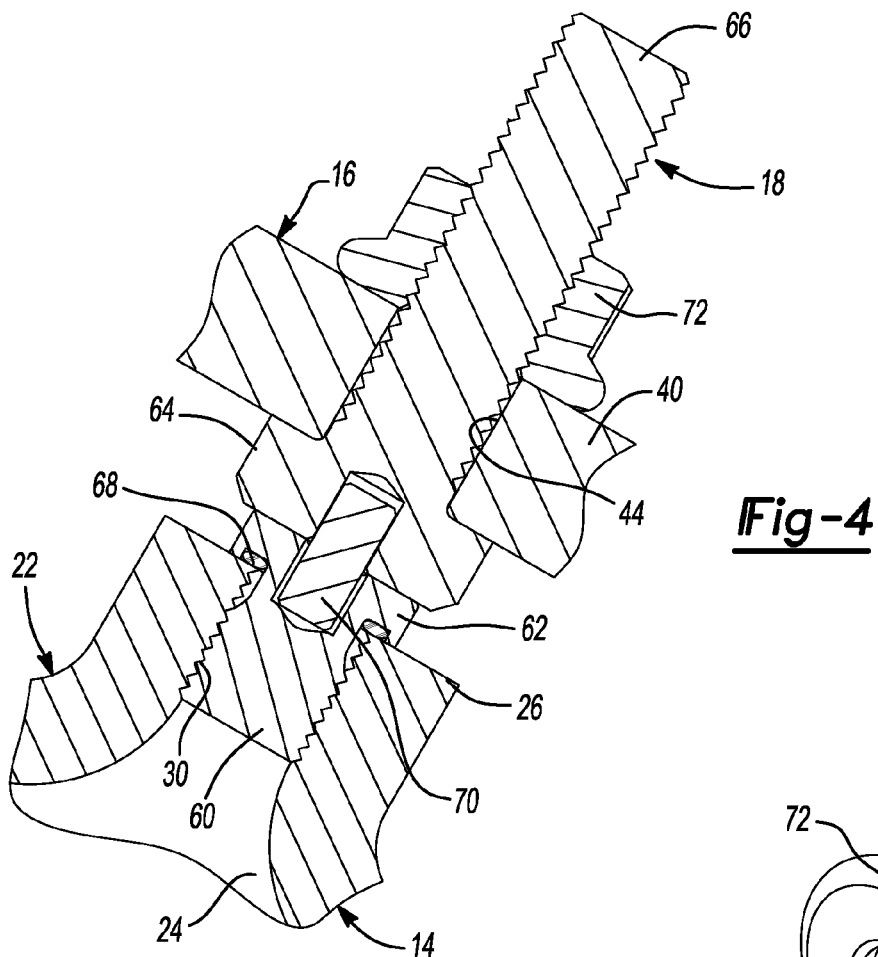
FIG. 4 is a cross-sectional view of a fill-plug installed in a fill-hole in the drivetrain component and securing the mounting bracket to the drivetrain component according to the principles of the present disclosure.

As shown in FIGS. 2 and 3, the mounting bracket 16 may be a generally U-shaped member having a body 34 and first and second arms 36, 38 extending from opposite ends of the body 34. The first arm 36 may include a flange 40. The flange 40 may extend outward from the first arm 36 and may include a first through-hole 44 (FIGS. 2 and 4). A plurality of lobes 42 may also be formed on the mounting bracket 16 and each may include a second through-hole 46 (FIG. 3). When the mounting bracket 16 and the housing 22 of the drivetrain component 14 are assembled together, the first through-hole 44 may be aligned with the fill-hole 30 and the second through-holes 46 may be aligned with corresponding threaded apertures 32 in the housing 22. As shown in FIG. 3, threaded fasteners 48 may extend through the second through-holes 46 and threadably engage the corresponding threaded apertures 32 in the housing 22. The fill-plug 18 may engage the first through-hole 44 and the fill-hole 30, as shown in FIGS. 2 and 4. In this manner, the fill-plug 18 and the fasteners 48 may cooperate to secure the housing 22 to the mounting bracket 16. As shown in FIGS. 2 and 3, additional mounting features 50, 52 disposed on distal ends of the first and second arms 36, 38, respectively, may engage (directly or indirectly) the structural member 21.

Figure 5:
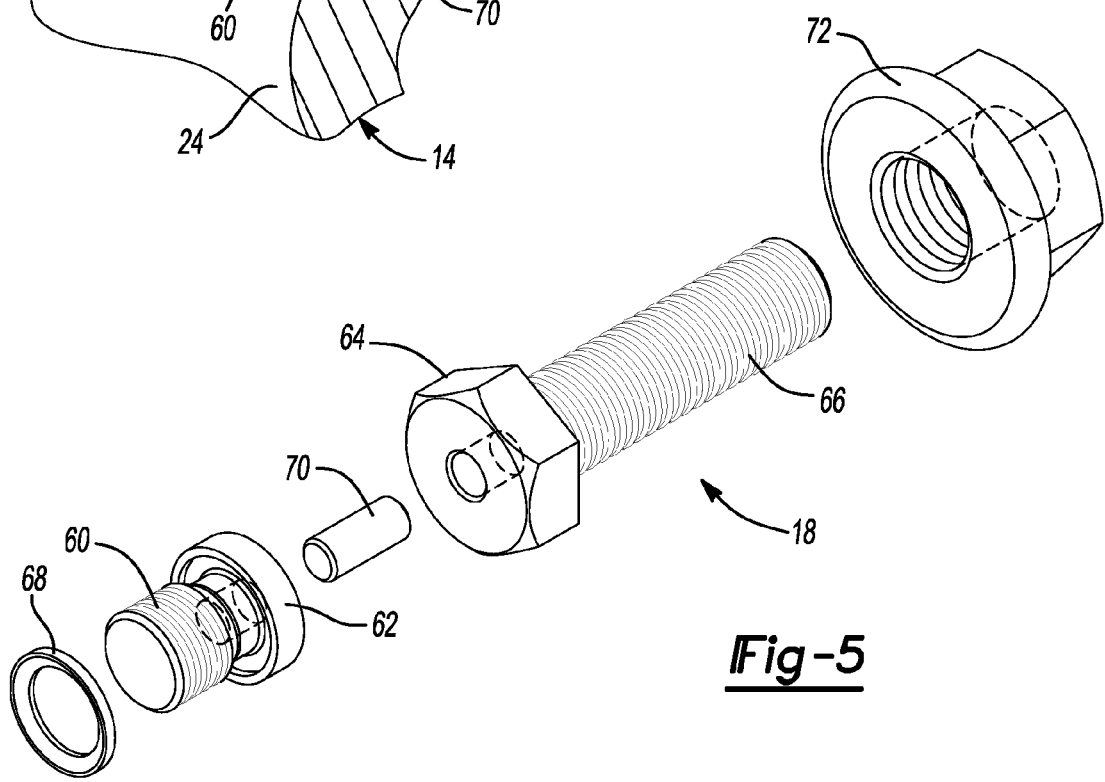
FIG. 5 is an exploded perspective view of the fill-plug of FIG. 4.

Referring now to FIGS. 4 and 5, the fill-plug 18 may include a first shaft 60, a first head 62, a second head 64, and a second shaft 66. The first shaft 60 may extend from the first head 62 and may include a first thread pattern that corresponds to a thread pattern of the fill-hole 30. An O-ring 68 or other seal may be disposed around a base of the first shaft 60 and may sealingly engage the first head 62 and the first boss 26 of the housing 22 to seal off the fill-hole 30 when the fill-plug 18 is fully installed therein. While not shown in the figures, in some embodiments, the first head 62 could be received within and sealingly engage a counterbore in the first boss 26. In such an embodiment, the second head 64 may be in contact with an exterior surface of the first boss 26.

The second head 64 may be hexagonally shaped, for example, and may be welded or otherwise joined to the first head 62 such that the first and second shafts 60, 66 may be substantially axially aligned with each other. In some embodiments, a pin 70 may engage sockets in the first and second heads 62, 64 to axially align the first and second heads 62, 64 with each other and to ensure the first and second heads 62, 64 maintain proper alignment with each other during a welding or other joining process securing the first and second heads 62, 64 to each other. In some embodiments, the second head 64 may be integrally formed with the first head 62.

The second shaft 66 may extend from the second head 64 in a direction opposite the first shaft 60. In some embodiments, the second shaft 66 may have a diameter that is substantially equal to or greater than a diameter of the first shaft 60. A length of the second shaft 66 may be substantially longer than a length of the first shaft 60. For example, the length of the second shaft 66 may be two-four times greater than the length of the first shaft 60. It will be appreciated that the relative lengths and diameters of the first and second shaft 60, 66 could vary from that described above.

The second shaft 66 may include a thread pattern that corresponds to a nut 72 that secures the flange 40 of the mounting bracket 16 to the second shaft 66. The thread pattern of the second shaft 66 may be different from the thread pattern of the first shaft 60. The thread pattern of the second shaft 66 may be more coarse and better suited for bearing a load of the housing 22, while the thread pattern of the first shaft 60 may be finer and better suited for fluidly sealing the fill-hole 30.

Figure 6:
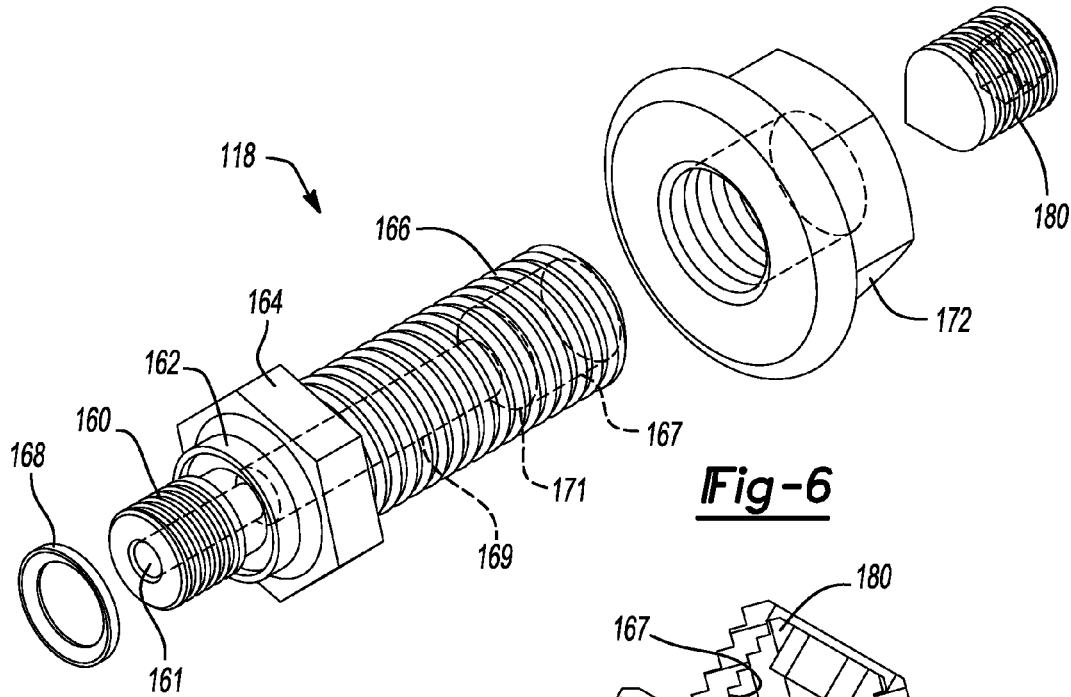
FIG. 6 is a cross-sectional view of another fill-plug securing the mounting bracket to the drivetrain component according to the principles of the present disclosure.
Figure 7:
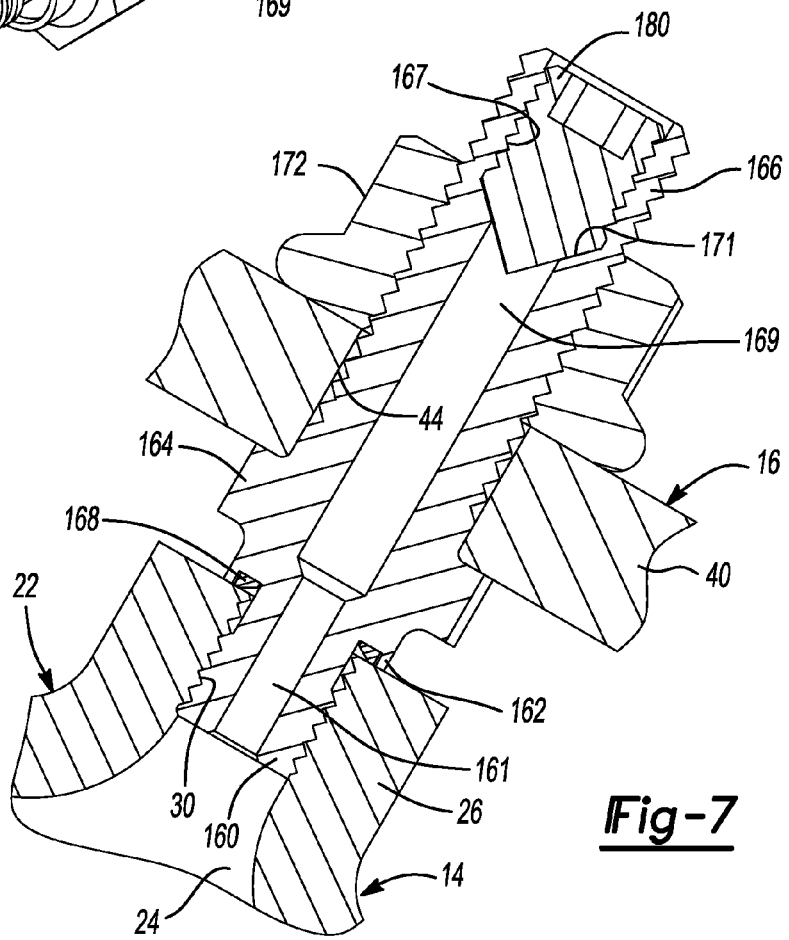
FIG. 7 is a cross-sectional view of the fill-plug of FIG. 6 installed in the fill-hole in the drivetrain component and securing the mounting bracket to the drivetrain component according to the principles of the present disclosure.

With reference to FIGS. 6 and 7, another fill-plug 118 is provided. The fill-plug 118 may be used as an alternative to the fill-plug 18 to seal the fill-hole 30 and secure the housing 22 to the mounting bracket 16. The structure and function of the fill-plug 118 may be generally similar to that of the fill-plug 18 described above, apart from any exceptions described below or shown in the figures. Therefore, features that are common to the fill-plug 118 and fill-plug 18 will not be described again in detail.

Similar to the fill-plug 18, the fill-plug 118 may include a first shaft 160, a first head 162, a second head 164, and a second shaft 166. As described above, the first and second heads 162, 164 may be separate bodies that are welded or otherwise joined together, or the first and second heads 162, 164 may be integrally formed as a single body. An O-ring 168 or other seal may be disposed around a base of the first shaft 160 and may sealingly engage the first head 162 and the first boss 26 of the housing 22 to seal off the fill-hole 30 when the fill-plug 118 is fully installed therein.

The first shaft 160 may extend from the first head 162 in a first direction and may include a first aperture 161 extending therethrough. The first aperture 161 is in fluid communication with the internal cavity 24 of the housing 22 when the first shaft 160 is engaged with the fill-hole 30.

The second shaft 166 may be axially aligned with the first shaft 160 and may extend from the second head 164 in a second direction opposite the first shaft 160. The second shaft 166 may include a second aperture 167 extending at least partially therethrough. At least a portion of the second aperture 167 may be threaded. The second aperture 167 may be in fluid communication with a third aperture 169 and the first aperture 161, and therefore, is in fluid communication with the internal cavity 24 of the housing 22 when the first shaft 160 is engaged with the fill-hole 30. The second aperture 167 includes a diameter that may be larger than a diameter of the first aperture 161 and substantially equal to or larger than a diameter of the fill-hole 30. In this manner, a standard nozzle that is typically used to fill and/or refill the internal cavity 24 with fluid can fit within the second aperture 167 and dispense fluid therethrough to the internal cavity 24. For example, the diameter of the second aperture 167 may be sized to accommodate a standard-sized nozzle for a standard transmission fluid dispensing device typically used in the automotive industry. The second aperture 167 may include a diameter that is larger than a diameter of the third aperture 169 such that a plug seat 171 is formed therebetween. A diameter of the first aperture 161 is substantially smaller than the diameter of the second aperture 167. The diameter of the first aperture 161 may be sized such that the structural integrity of the first shaft 160 is not significantly compromised.

Because the diameter of the second aperture 167 is at least as large as the outer diameter of the first shaft 160, a diameter of the second shaft 166 is substantially larger than the outer diameter of the first shaft 160. For example, the outer diameter of the first shaft 160 could be approximately fourteen millimeters and the outer diameter of the second shaft 166 could be approximately twenty millimeters. The second shaft 66 may include a thread pattern that corresponds to a nut 172 that secures the flange 40 of the mounting bracket 16 to the second shaft 166.

The fill-plug 118 may also include a sub-plug 180 that may threadably engage the second aperture 167 and seat against the plug seat 171 to seal off the second aperture 167. The sub-plug 180 can be a set screw, for example, that can be removed from the second aperture 167 without disassembling the fill-plug 118 from the fill-hole 30 or disassembling the mounting bracket 16 from the fill-plug 118. In this manner, the housing 22 can remain securely fixed to the chassis while a technician adds fluid to the internal cavity 24 through the first and second apertures 161, 167.

What is claimed is:

1. A drivetrain component adapted to be secured to a structure for securing the drivetrain component relative to a vehicle frame, the drivetrain component comprising:
   a housing defining an internal cavity adapted to receive a fluid, the housing including a hole in communication with the internal cavity; and
   a plug including a first shaft, a second shaft and at least one head disposed between the first and second shafts, the first shaft engaging the hole and cooperating with the head to seal the hole, the second shaft extending away from the hole and adapted to engage the structure,
   wherein the plug bears at least a portion of a load of mounting the drivetrain component to the vehicle frame.

2. The drivetrain component of claim 1, wherein the first and second shafts and the head are integrally formed.

3. The drivetrain component of claim 1, wherein the plug includes a pair of heads fixed to each other.

4. The drivetrain component of claim 1, wherein the first and second shafts are substantially axially aligned with each other and extend from the head in opposite directions.

5. The drivetrain component of claim 1, wherein the housing includes a transmission housing.

6. The drivetrain component of claim 1, wherein the internal cavity contains a volume of lubricant.

7. The drivetrain component of claim 1, wherein the housing includes a boss through which the hole extends, and wherein the head sealingly engages a surface of the boss.

8. The drivetrain component of claim 1, wherein the plug includes a sub-plug removably engaging an aperture in at least one of the first and second shafts, the aperture in fluid communication with the internal cavity.

9. The drivetrain component of claim 8, wherein the aperture extends through the second shaft and is in fluid communication with another aperture that extends through the first shaft, the aperture in the first shaft having a smaller diameter than the aperture in the second shaft.

10. The drivetrain component of claim 1, wherein the hole in the housing is a fill-hole.

11. A vehicle comprising:
    a chassis;
    a mounting bracket secured to the chassis;
    a drivetrain component including a housing defining an internal cavity and including a fluid fill-hole in communication with the internal cavity and extending through an exterior surface of the housing;
    a first shaft engaging the fluid fill-hole and having a head on one end; and
    a second shaft extending outward from the head and engaging an aperture of the mounting bracket, the second shaft bearing at least a portion of a mounting load of the housing and transmitting at least a portion of the mounting load through the first shaft.

12. The vehicle of claim 11, wherein the first and second shafts and the head are integrally formed.

13. The vehicle of claim 11, wherein the second shaft includes a head that is fixed to the head of the first shaft.

14. The vehicle of claim 13, further comprising a pin engaging the heads of the first and second shafts and aligning the first and second shafts relative to each other.

15. The vehicle of claim 11, wherein the first and second shafts are substantially axially aligned with each other and extend from the head in opposite directions.

16. The vehicle of claim 11, wherein the drivetrain component includes a transmission.

17. The vehicle of claim 11, wherein the internal cavity contains a volume of lubricant.

18. The vehicle of claim 11, wherein the transmission housing includes a boss through which the fluid fill-hole extends, and wherein the head sealingly engages a surface of the boss.

19. The vehicle of claim 11, wherein the fill-plug includes a sub-plug removably engaging an aperture in at least one of the first and second shafts, the aperture in fluid communication with the internal cavity.

20. The vehicle of claim 19, wherein the aperture extends through the second shaft and is in fluid communication with another aperture that extends through the first shaft, the aperture in the first shaft having a smaller diameter than the aperture in the second shaft.

* * * * *